April 9, 1940.                M. ZAIGER                2,196,542
                       AUTOMOBILE WINDOW WIPER
                       Filed April 12, 1938          2 Sheets-Sheet 2
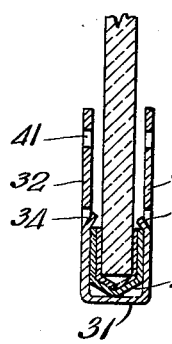
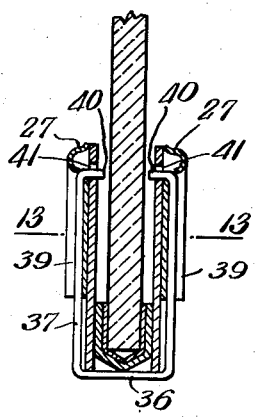
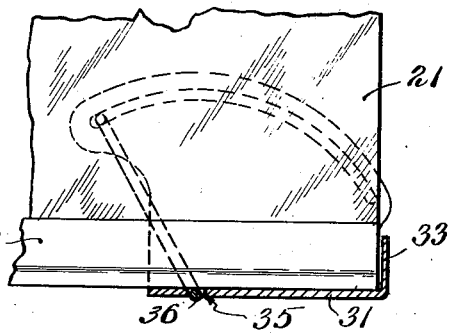
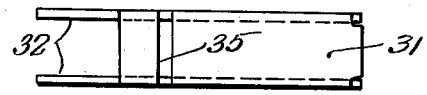
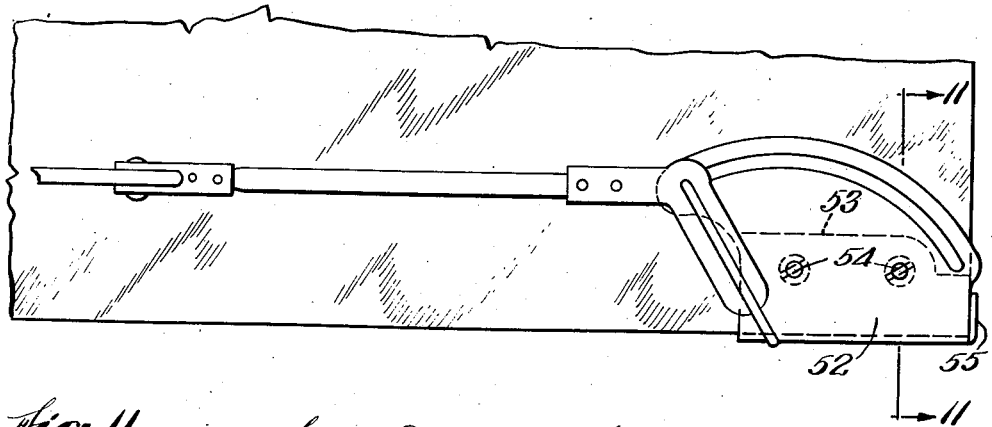
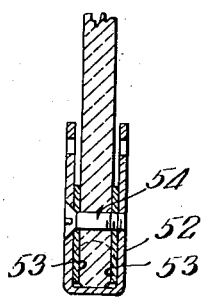
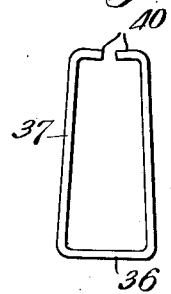
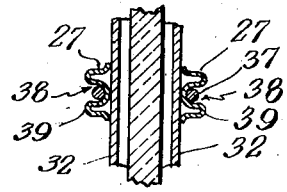
Inventor:
MAX ZAIGER
by Thomson & Thomson
his Atty's Patented Apr. 9, 1940

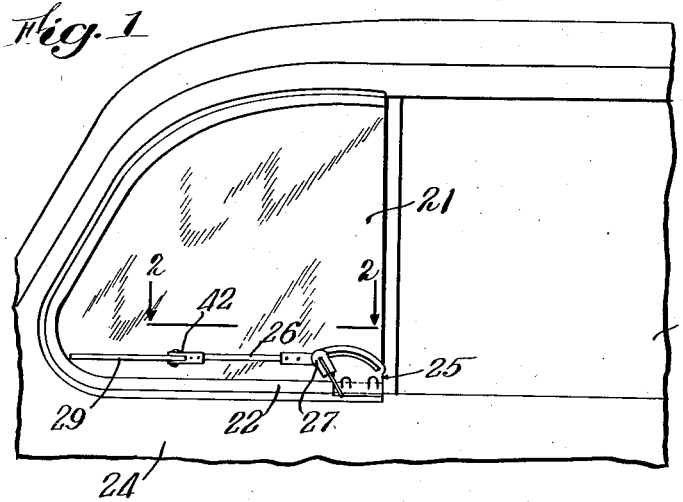
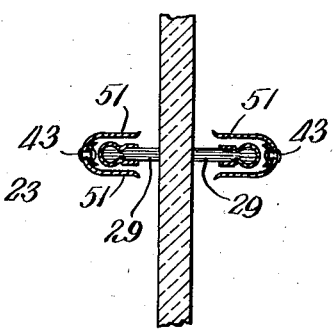
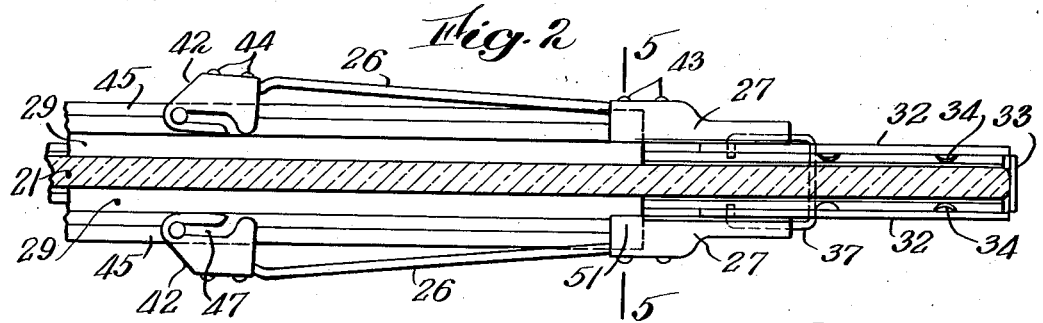
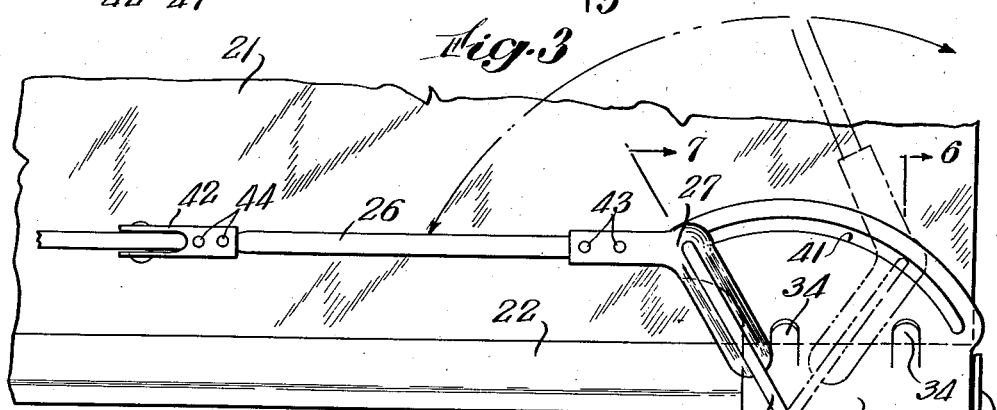
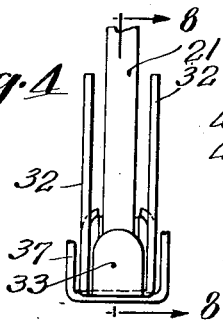
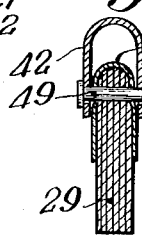

2,196,542

UNITED STATES PATENT OFFICE 2,196,542

AUTOMOBILE WINDOW WIPER

Max Zaiger, Swampscott, Mass.

Application April 12, 1938, Serial No. 201,538

10 Claims. (Cl. 15—255)

This invention relates to wipers for cleaning the windows of motor or other vehicles; and pertains more particularly to devices of the general character of windshield wipers, adapted for application to the edge of a movable window, such as the ventilating panes of automobiles.

The principal purpose of the invention is to provide a simple, economical and efficient cleaning device, utilizing a blade of the type used in the ordinary windshield wiper, for wiping rain, moisture or snow from the outside, and preferably also the inside, of a ventilating window or pane which is adapted to be opened so that both sides are exposed to the elements. As is well known, such panes are customarily hinged to swing on a vertical axis in front of the vertically movable windows of the car door, so that, whether closed or open, they occupy a position in the line of vision of the driver and passenger in the front seat, with respect to traffic or obstructions which are not directly in front of the vehicle. It is extremely important, from considerations of safety and convenience, that this angular line of vision through the ventilating panes or wind deflectors be clear and unobstructed by rain or snow; yet, so far as I am aware, no mechanical cleaning device for ensuring a clear view through such panes in inclement weather had been provided before my invention was developed.

Further and more specific objects of this invention reside in the novel structural features of the devices hereinafter described, which afford easy assembly of its several parts; ready application to and removal from the margin of the pane, and secure attachment thereto so that the pane may be freely opened or closed; adequate operative movement of the wiper blade under manual actuation, within a limited arc of swing which confines this movement to a correct area and prevents the blade from interfering with the latches or catches for holding the pane closed; efficient operation of the wiper blades which are tensioned against the pane and are held against chattering at the pivotal connections to the wiper arm; and easy attachment of the blade to the arm by means of an improved form of separable connection.

Recommended embodiments of the invention are illustrated in the accompanying drawings, in which:

Fig. 1 is a fragmentary side view of the front compartment of a vehicle having a typical form of ventilating pane equipped with the improved wiper;

Fig. 2 is an enlarged section of the pane and wiping device, taken on line 2—2 of Fig. 1;

Fig. 3 is an enlarged side elevation of the pane and wiper of Fig. 1;

Fig. 4 is an end view looking to the left of Fig. 3 with portions of the movable parts broken away;

Fig. 5 is a transverse section on line 5—5 of Fig. 2;

Figs. 6 and 7 are sectional views taken on lines 6—6 and 7—7, respectively of Fig. 3;

Fig. 8 is a detail section on line 8—8 of Fig. 4;

Fig. 9 is a bottom view of Fig. 8;

Fig. 10 is a view similar to Fig. 3, showing a modified form of attachment adapted for a plain edged pane;

Fig. 11 is a section on line 11—11 of Fig. 10;

Fig. 12 is a detail view of a spring member forming part of the device;

Fig. 13 is a section on line 13—13 of Fig. 7;

Fig. 14 is a detail transverse section taken through one of the wiper blade and clip attachments shown in Fig. 2; and Fig. 15 is a detail side view of a connector shown in Figs. 2 and 14.

In the particular embodiment chosen for the purpose of illustration (except for the modifications shown in Figs. 10 and 11), the improved wiping device is applied to a ventilating pane 21 provided with a molding or reinforcement 22 along its bottom, front and upper margins. It will be understood that this pane is pivoted on a vertical axis in front of the main window 23, so that its plain or uncovered rear edge may swing outwardly of the door 24 and thus serve as a ventilator and wind deflector, in accordance with common practice. The wiper apparatus is adapted to be attached over the molding 22 at the lower rear corner of pane 21, as shown in Figs. 1 and 3.

In this arrangement, the apparatus comprises, essentially, a U-shaped clamp, indicated generally at 25 in Fig. 1; a pair of wiper arms 26 having angularly disposed elbows 27 at their rearward ends; a U-shaped spring 37, of heavy wire, removably and resiliently connecting the arms 26 to the clamp 25; and wiper blades 29 attached, preferably by a detachable joint, to the forward ends of the wiper arms, and bearing against opposite sides of the pane 21, so that they may be swung across the surfaces of the glass by grasping one of the wiper arms (e. g. the arm on the inside of the pane) with the hand.

The clamp 25 has a flat base portion 31 which bears against the outer edge of the molding 22, side portions 32 extending upwardly parallel to the glass pane, and an end piece 33 bent upwardly from its base and engaging the corner of the pane to limit inward movement of the clamp on the molding 22. Its sides 32 are provided with inwardly struck tabs 34 which engage over the inner edges of the molding, so that the clamp may be slid endwise onto the molding and will be removably held in position by the tabs 34 and the end piece 33, and the frictional grip of the sides 32 on the molding. If a permanent attachment is desired, the clamp may be bolted or screwed to the molding in an obvious manner; e. g. as indicated in the modification shown in Figs. 10 and 11.

The base portion of the clamp is formed with a slot 35 which receives the loop 36 of a stout wire spring 37. The spring is U-shaped, and its side arms engage in grooves 38 extending longitudinally of the elbows 27 between parallel ribs 39 formed thereon.

The free ends 40 of the spring are bent inwardly and pass through holes in the elbows 27 and into arcuate slots 41 cut in the respective sides 32 at the upper portion thereof. These slots constitute guides for the swing movement of the spring 37 and limit the arc of swing of the wiper arms as well as the spring, as will be apparent.

Thus, the wire spring serves as the sole connection between the clamp and the wiper arms; it operates as a lever whereby both arms are moved simultaneously when one is manipulated by the hand of the driver or occupant of the automobile; and it yieldingly holds the elbows 27 in place and presses the wiper blades against the surfaces of the glass. It will be evident that the wiper arms are readily attached to or disconnected from the clamp member by springing the wire 37 into or out of engagement with the elbow grooves 38 and the slots 41 of the clamp sides. It will also be apparent that the slot 35 in the base of the clamp not only affords a fulcrum for swinging movement of the U-shaped spring, but also provides a recess which substantially accommodates the thickness of the loop of the spring, so that the latter does not interfere with the closing of the ventilating pane.

The wiper arm bar 26 is connected to its elbow 27 and also to a forward clip 42 by rivets 43 and 44, respectively, in the form shown; but it will be understood that two or more of these elements may be made in one piece if desired. The clips 42 are U-shaped in form and are adapted to straddle the metal blade holders 45 which embrace the rubber wiper blades 29, as is customary practice. As best shown in Figs. 3, 14 and 15, the clips 42 are of improved form in that their sides are provided with complemental slots 47 which enter at the bottom edge of said sides, extend parallel thereto and terminate in notches 48 near the outer ends of the clip. The slots of each clip receive the protruding ends of a double headed rivet or pin 49 which passes through the blade holder 45 near the center thereof; and the rivet is held in the notches 48 when it is snapped into locking engagement therewith, by the action of the resilient fingers 50 which yield to allow the pin to enter the slots 47 and retaining notch 48.

The improved connection between the wiper arm and the blade holder ensures a secure but readily separable attachment, and allows the blade to pivot on the rivet 49 while restraining other relative movement between the parts, inasmuch as the clip is rigidly fastened to the arm 26 and as its sides closely hug the metal blade holder 45 in normal operation. The restraint of free movement or "chattering" of the blade is particularly important in a device, such as that herein disclosed, which is intended for manual operation adapted to swing the blade upwardly from a horizontal to a vertical position, as indicated in Fig. 3; and the attainment of this objective is further aided by guiding the free inner end of the blade, as shown in Figs. 3 and 5. In those views, the outer portion of each elbow member 27 has a U-shaped form and its depending sides 51 straddle the rearward end of the wiper blade, thus holding the blade substantially parallel to the wiper arm 26, during swinging movement across the glass.

In the modified arrangement shown in Figs. 10 and 11, the wiper is adapted for application to a plain edged pane, having no molding or beading on its edges. In this form, the sides of the U-shaped clamp 52 are spaced closer together to embrace the surfaces of the pane, cushion strips 53 being placed between the clamp sides and the pane surfaces if desired; and fastenings such as the bolts 54, passing through the glass, are provided to secure the clamp in position. Otherwise, the wiping devices are the same as heretofore described. It will be understood, however, that the end piece 55 of Fig. 10 may be omitted so that the clamp 52 may be attached to the margin of the pane at any desired position.

In both forms, it will be observed that the length and direction of the slot 41 which limits the swing of the wiper arm, as aforesaid, supports the arm parallel to but spaced a substantial distance from the adjacent edge of the pane, in the lowermost position of the arm. This allows adequate space for the closing of the pane and for the operation of catches or locks for securing the pane in closed position, without interference with the wiping apparatus.

It will also be observed (as best shown in Fig. 13) that the elbow members 27 have a relatively broad base or bearing on the surface of the clamp sides 32, against which the elbows are pressed by action of spring 37. When that portion of the elbow is bent, as shown, to provide the outer ribs 39 and intermediate groove 38, the elbow has three bearings against the clamp, which prevent tilting or twisting of the elbow and thus hold the wiper arm 26 and blade 29 in correct alignment. It will be evident, however, that the base of the elbow may be made flat or may have two or more bearing surfaces against the clamp; and it will be understood that my use of the term "broad base" contemplates such obvious modifications in the shape of the elbow.

The general purpose and mode of operation of the wiping apparatus herein disclosed will be obvious from the foregoing and from the general use of the present forms of windshield wipers for automobiles. In adapting the old types of wipers for cleaning the ventilating panes with which motor vehicles are now commonly equipped, I have satisfied a long existing need and have provided a wiper containing several novel and improved features which will be pointed out in the appended claims. It will be understood that the structural details herein illustrated and described may be varied to suit particular installation without departing from the essence of this invention as defined in the claims; and it will be apparent, in particular, that I do not necessarily limit my invention to the provisions of two wiper blades. One blade—on the outside of the pane—may suffice in many cases; and a handle or arm similar in arrangement to the inside wiper arm herein shown will serve as a means of operating the outside blade.

I claim:

1. Wiping apparatus for cleaning a pane of the character described, comprising a clamp member applied to the margin of the pane, means for holding the clamp on said margin, a wiper arm extending over a surface of the pane and carrying a wiper blade bearing on said surface, an operating arm on the opposite side of the pane, the clamp comprising base and side portions, the bottom portion bearing against the edge of the pane and having a transverse slot therein, and the side portions extending inwardly on opposite sides of the pane and having arcuate slots remote from the base portion, and a U-shaped wire spring straddling the clamp and having a loop portion pivotally engaged in said base slot and inwardly bent end portions engaging in said arcuate slots, respectively, to guide and limit pivotal movement of the spring, the side portions of the spring engaging portions of the wiper arm and operating arm, respectively, so that the wiper blade is urged toward the pane surface and is swung angularly thereon by moving the operating arm.

2. Wiping apparatus for cleaning a pane of the character described, comprising a clamp member adapted to be applied to the margin of the pane, means for holding the clamp on said margin, a wiper arm extending over a surface of the pane and carrying a wiper blade bearing on said surface, an operating arm on the opposite side of the pane, and resilient means for removably connecting the wiper arm to the operating arm and for pivotally connecting both arms to the clamp, so that the wiper blade is yieldingly held against said pane surface and is swung angularly across said surface by moving the operating arm, the clamp having an end piece abutting a corner of the pane whereby the clamp is held at said corner by frictional engagement with the margin of the pane, and is prevented from sliding inwardly along said margin by said abutment.

3. Wiping apparatus for panes having an edge molding of the character described, comprising a clamp member having base and side portions and adapted to be slid endwise onto the molding from a corner of the pane so that its base bears against the edge of the molding and its sides overlie the sides of the molding, the sides of the clamp being substantially flat and said sides having inwardly struck tabs frictionally engaging the molding and tending removably to hold the clamp in position, the clamp also having an end piece bent upwardly from its base and engaging the corner of the pane to limit inward movement of the clamp on the molding, a wiper arm having a blade bearing against one surface of the pane and an end portion bearing against one flat side of the clamp, an operating arm disposed on the opposite side of the pane, and means pivotally connecting the wiper arm and operating arm to the clamp, so that the wiper blade is swung angularly over the pane surface by moving the operating arm.

4. Wiping apparatus for panes having an edge molding of the character described, comprising a clamp member having base and side portions and adapted to be slid endwise onto the molding from a corner of the pane so that its base bears against the edge of the molding and its sides overlie the sides of the molding, the sides of the clamp being substantially flat and said sides having inwardly struck tabs frictionally engaging the molding and tending removably to hold the clamp in position, the clamp also having an end piece bent upwardly from its base and engaging the corner of the pane to limit inward movement of the clamp on the molding, a wiper arm having a blade bearing against one surface of the pane and an end portion bearing against one flat side of the clamp, an operating arm disposed on the opposite side of the pane, and means connecting the wiper arm and operating arm to the clamp to swing the wiper blade angularly over the pane surface by moving the operating arm, the clamp sides and the connecting means having interengaging portions remote from the base of the clamp for guiding and limiting movement of said arms.

5. In wiper apparatus of the class described, a wiper arm having an elbow at one end and a clip at its other end, a blade connected to said clip, and supported in line with the arm, the elbow being formed of sheet metal bent to provide depending side portions extending parallel to the arm and straddling the blade, thereby to restrain angular movement of the blade with respect to the arm, said sheet metal elbow also being bent to provide a channel, and means engaging the channel of the elbow for swinging the arm angularly over the surface of a pane.

6. In wiper apparatus of the class described, a clamp for connecting a wiper arm and its blade to the margin of a window, the clamp consisting of a substantially U-shaped member having side and base portions and adapted to embrace the margin of the window, the base having means pivotally engageable by a spring member adapted to operate the wiper arm, and the sides having slots engageable by said spring member for guiding and limiting the movement thereof.

7. In wiper apparatus of the class described, a pair of wiper arms disposed respectively on opposite sides of a pane, wiper blades connected to the respective arms at one end thereof and bearing upon opposite surfaces of the pane, elbow members at the opposite ends of the respective arms, each elbow having a groove in its outer surface and a hole at one end of said groove, a U-shaped spring straddling the edge of the pane and engaging in the respective elbow grooves, the ends of the spring being bent inwardly into said holes, thereby to interconnect the two wiper arms and press their blades against the pane surfaces, and means for holding the loop of the spring against the edge of the pane so that manual movement of one arm will cause both arms to swing concomitantly.

8. In wiper apparatus of the class described, a clamp adapted to embrace the margin of a window and having substantially parallel sides, a wiper arm having an end portion disposed on the outer surface of one of said sides, said end portion having a relatively broad base bearing against said surface and tending to prevent twisting of the wiper arm, and means for holding the end portion in position and for moving it angularly over said surface.

9. In wiper apparatus of the class described, a pair of wiper arms disposed respectively in opposite sides of a pane, wiper blades connected to the respective arms at one end thereof and bearing upon opposite surfaces of the pane, elbow members at the opposite ends of the respective arms, each elbow having a groove in its outer surface and a hole at one end of said groove, a U-shaped spring straddling the edge of the pane and engaging in the respective elbow grooves, the ends of the spring being bent inwardly into said holes, thereby to interconnect the two wiper arms and press their blades against the pane surfaces, a clamp member having base and side portions disposed between the pane and the spring, the base of the clamp having a transverse slot receiving the loop of the spring and constituting a fulcrum therefor, and the sides of the clamp having arcuate slots receiving said spring ends thereby to guide and limit swinging movement of the arms when one of them is manually operated.

10. In wiper apparatus of the class described, a clamp for connecting a wiper arm to the margin of a window, the clamp having a portion embracing the window margin and an inwardly extending side constituting a guide for the wiper arm, means for removably securing the clamp on said margin, a wiper arm having a relatively broad end portion bearing against the outer surface of said clamp side and slidable thereon, thereby to restrain twisting of the arm during angular movement thereof, and means for holding the wiper end against said side and for moving it angularly over said surface, said means comprising a U-shaped member straddling the clamp and having an operating portion extending over the outer side of the clamp, the clamp side and wiper arm end having mutually co-operative means for limiting angular movement of the wiper arm.

MAX ZAIGER.